Figure 1:
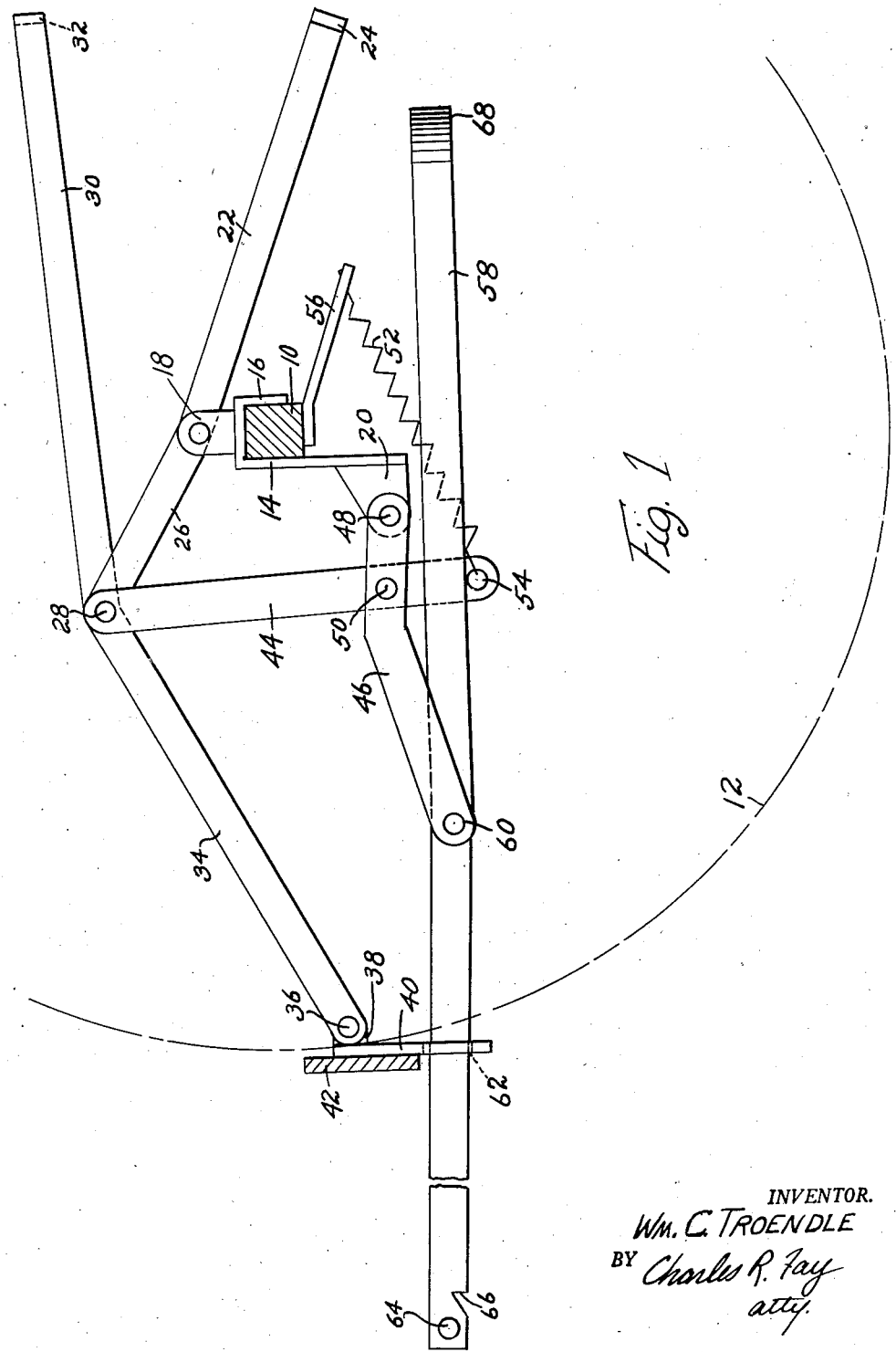

July 11, 1944.  W. C. TROENDLE  2,353,326
SAFETY STAND FOR BABY CARRIAGES
Filed Nov. 4, 1943   2 Sheets-Sheet 1

INVENTOR.
WM. C. TROENDLE
BY Charles R. Fay
atty.

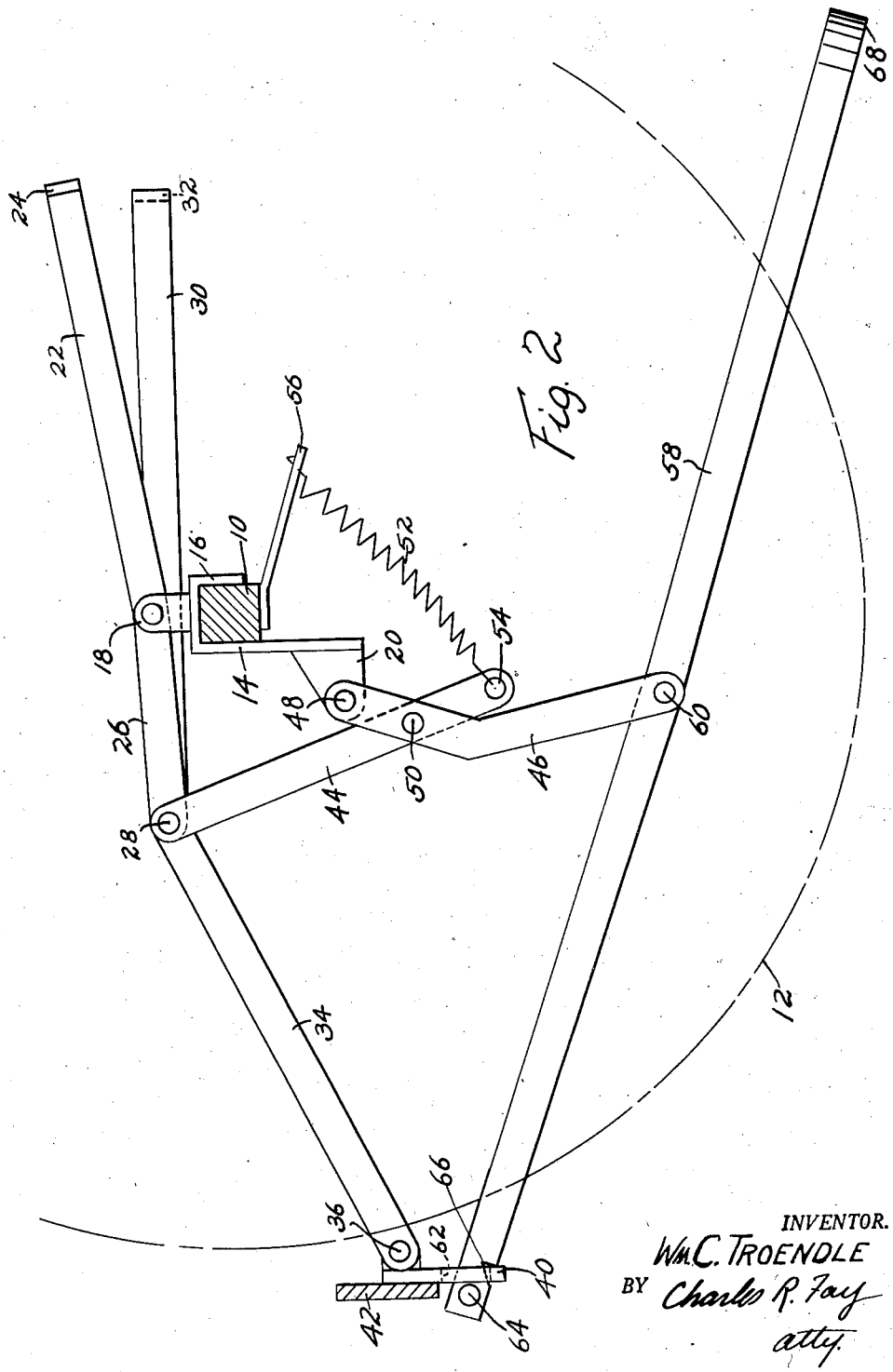

Patented July 11, 1944

2,353,326

UNITED STATES PATENT OFFICE 2,353,326

SAFETY STAND FOR BABY CARRIAGES

William C. Troendle, Gardner, Mass., assignor to Thayer Company, Gardner, Mass., a corporation of Massachusetts Application November 4, 1943, Serial No. 508,915

8 Claims. (Cl. 280—44)

This invention relates to a new and improved device for preventing baby carriages or the like from tipping due to the activities of the occupant of the carriage.

Objects of the invention include the provision of a device for preventing tipping or tilting of baby carriages and comprises a member which is normally positioned in an out of the way location but which may be moved to a position engaging the ground so that the carriage cannot be tipped over by the occupant; the provision of an anti-tipping stand element for baby carriages, said element being associated with the rear axle of a carriage and normally positioned close thereto in an out of the way up position, there being foot-operated means for moving the element rearwardly, and downwardly, as distinguished from a mere pivoted action, to engage the ground well to the rear of the wheels on the rear axle so that the element engages the ground in a position to prevent any possible tilting action of the carriage about the rear wheels.

Other objects and advantages of the invention will appear hereinafter, reference being had to the accompanying drawings, in which Fig. 1 shows the invention as applied to the rear axle of a carriage and illustrates the parts in normal position; and Fig. 2 shows the parts as they appear in operative position.

The conventional stand for preventing the tipping over of a baby carriage by reason of the occupant weighting the carriage at the rear end, i. e., the end to which the handle is attached, is characterized in that such a stand pivots about a fixed axis in such a manner that the carriage is enabled to tilt to some degree before the stand engages the ground. In other words, the prior art is limited to a construction in which the stand is located somewhat above the ground even when it is fully extended, and also prior stands do not extend to the rear of the wheels. This invention contemplates a construction wherein the stand will substantially engage the ground when the carriage is at or near level position and will also be located well to the rear of the wheels, thus preventing tipping of the vehicle about the rear wheels.

The drawings illustrate one form of the invention in which the reference numeral 10 indicates the rear shaft of the carriage on which the rear wheels are rotatably mounted. The periphery of the wheels is indicated by the line at 12, these wheels not being shown for purposes of clarity of illustration. However, it will be appreciated that the shaft 10 will be centrally located relative to the periphery 12 of the wheels.

A bracket 14 is secured to the shaft 10, this bracket having a leg 16 for this purpose, and it is also provided with an upstanding lug 18 at the top of the shaft and a forwardly extending lug 20 depending below the shaft. A lever 22 is pivoted on lug 18 and this lever is provided with a lateral foot 24 for pedal operation thereof. As shown, lever 22 extends to the rear for convenience of pedal operation and it also extends somewhat forwardly of lug 18 as shown at 26. The portion 26 of the lever is arranged at a slight angle to the major part thereof and terminates at its forward end with a pin 28.

A second and longer lever 30 having a foot 32 is pivoted intermediate its ends on pin 28. Lever 30 extends forwardly as at 34 at an angle and is pivoted by a pin 36 to an ear 38 forming a part of the bracket 40. Bracket 40 is secured by any desired means to a spring strip 42 to which the conventional carriage brake may be secured. The brake construction is not shown as it forms no part of the present invention and may assume conventional form.

A substantially straight lever 44 is pivoted at one end on pin 28 and depends therefrom. A lever 46 is pivoted at pin 48 to lug 20, and as shown in Fig. 1, this lever is angular and is pivoted at 50 to lever 44. A spring 52 is connected from the lower end 54 of lever 44 and to a bracket 56 located in fixed relation to the carriage, as for instance, on shaft 10. Levers 44—46 form a species of toggle joint.

A ground-engaging lever 58 is pivoted as at 60 to the end of lever 46 opposite from lug 20. Bracket 40 is provided with a slot 62 in which lever 58 is slidable and as shown in Fig. 2, lever 58 is provided with a stop 64 and a notch 66.

With the parts shown in Fig. 1, spring 52 maintains lever 58 in the position shown, that is, in an up position free of the ground and also free from interfering with the operator by reason of the fact that its rearwardmost end 68 is located forwardly of the periphery 12 of the wheels and forwardly of the pedal end of levers 22 and 30. Spring 52 holds the parts in this position because of the fact that pin 50 is located past dead center relative to pin 48 and the action of the spring is to tend to bring lever 46 upwardly or clockwise in Fig. 1.

However, if the uppermost pedal lever 30 in Fig. 1 be pushed down by the foot of the operator, this action will force lever 44 downwardly and lever 22 correspondingly upwardly. Lever 44 therefore will swing lever 46 in a counterclockwise direction about pin 48 and this action will bring element 58 downwardly and to the rear until the parts assume the position shown in Fig. 2. Fig. 2 represents the limit of movement of the parts and as pin 50 is now at the other side of pin 48 relative to spring 52, the parts will be held in this position wherein the end 68 of lever 58 engages the ground or just fails to engage, depending on which condition is desired. At this point the element 58 has been extended towards the rear sufficiently for its forward end to drop to be latched by notch 66, and hence element 58 is locked and cannot be raised except by pressing downwardly upon lever 22 which is now higher than lever 32. By pushing down on lever 22 in Fig. 2, lever 44 will be raised and this will swing lever 46 in a clockwise direction to return the element 58 to Fig. 1 position.

It will be seen from the above description that the ground engaging element 58 is brought from its out of the way position in Fig. 1 downwardly to the rear in such a way as to substantially engage or to just fail to engage the ground at point 68, and therefore, the carriage cannot be tipped over or tilted about the rear wheels.

It will be noted that in Fig. 2 the spring strip 42 is slightly forward of the position in Fig. 1, and this action is sufficient to apply the usual brakes to the wheels. Hence the ground engaging element 58 is correctly positioned and the brakes are applied to the wheels simultaneously.

Having thus described my invention and the advantages thereof, I do not wish to be limited to the details herein disclosed, otherwise than as set forth in the claims, but what I claim is:

1. In a device of the class described, the combination with an axle and wheels of a carriage or the like, of a lever pivoted at a fixed point on the carriage, a second lever pivoted to the first named lever, a slidable ground-engaging stop element, an operating device connecting the stop element and both levers, said operating device being effective to slide the stop element downwards and outwards relative to the axle upon actuation of said first named lever.

2. In a device of the class described, the combination with an axle and wheels of a carriage or the like, of a lever pivoted intermediate its ends on the axle, a second lever pivoted intermediate its ends adjacent one end of the first named lever, an operating device connected at one end to the connection of said levers and adapted to be extended by actuation of one lever and retracted by the other, a slidable and swingable ground-engaging stop element pivoted at the other end of the operating device, and a spring to hold the operating device in extended or retracted position.

3. In a device of the class described, the combination with the rear axle of a carriage or the like, of a pair of foot levers, one lever being pivoted intermediate its ends to an end of the other lever, the latter being pivoted at a fixed point on the carriage, a third lever pivoted at one end to both levers, a fourth lever pivoted at one end to a fixed part of the carriage and also pivoted to the third lever, so that one foot lever may be actuated to extend the third and fourth levers and the other foot lever may retract the same, a ground-engaging element connected to the fourth lever for movement thereby, and a guide for said element.

4. In a device of the class described, the combination with the rear axle and wheels of a carriage or the like, of a pair of foot levers pivoted together, one lever having a pivot connection with a fixed part of the carriage, an operating lever pivoted to a fixed part of the carriage, a member pivotally connecting the operating lever to said foot levers and operated thereby to swing in a vertical plane down and towards the rear of the carriage and return, a ground-engaging element connected to the operating lever to be moved down and to the rear therewith, said ground-engaging element being slidable for this purpose.

5. The device of claim 4 including a spring to maintain the operating lever in either of its two positions.

6. The device of claim 4 including a spring connected to said member, and a guide for the ground-engaging element.

7. In a device of the class described, the combination with the rear axle and wheels of a carriage, of a foot lever pivoted to the axle, a second foot lever pivoted to the first lever, a pair of crossed operating levers pivoted together, one operating lever being connected to said foot levers and the other to the axle, a ground-engaging element pivoted to said other operating lever and swingable thereby from an up position within the wheel area to a down position wherein a part thereof extends rearwardly of the area defined by the wheels, and means to resiliently maintain the parts in both positions.

8. The device of claim 1 wherein said operating device is effective to provide for retraction of the stop element upon actuation of the other of said levers.

WILLIAM C. TROENDLE.